Figure 1:
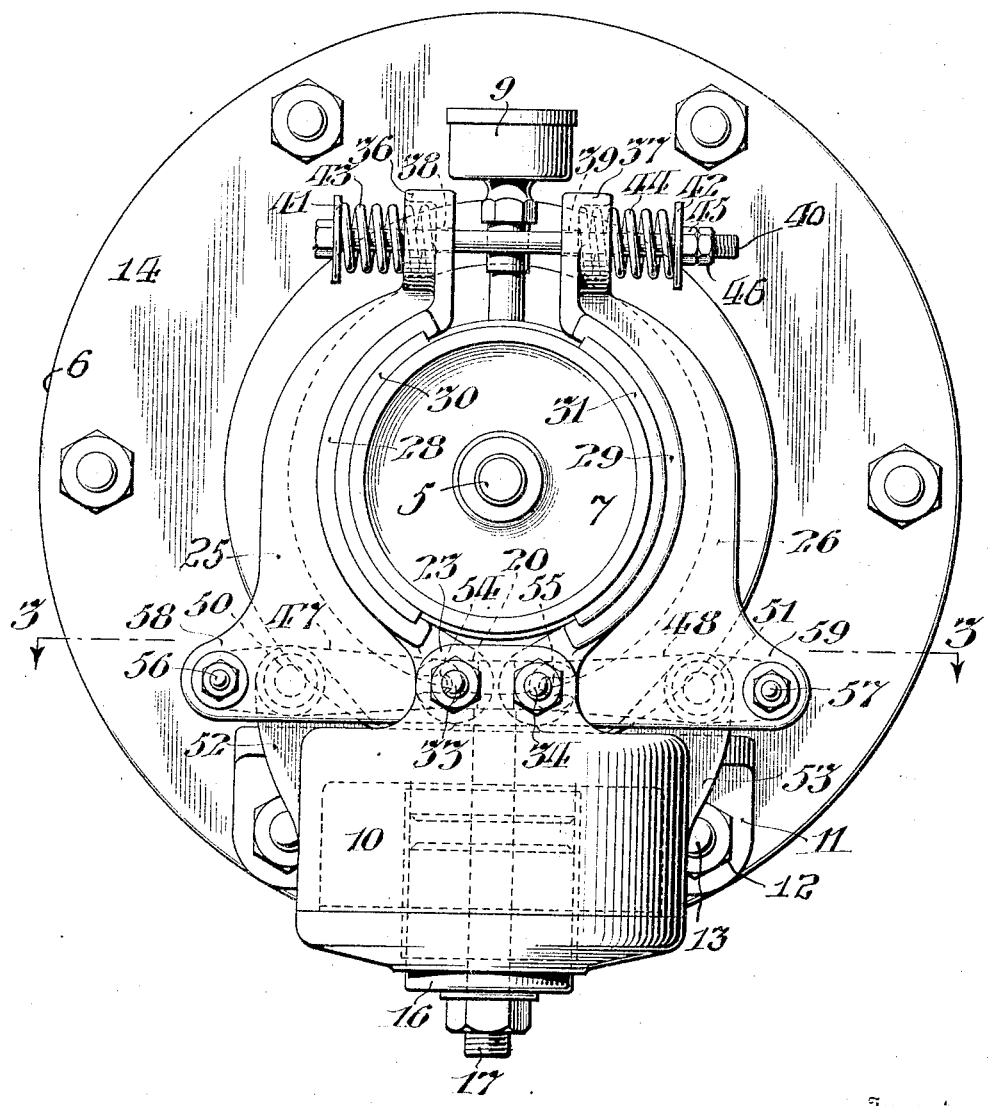

H. S. VALENTINE.
ELECTRIC BRAKE FOR HOISTS.
APPLICATION FILED JULY 31, 1912.

1,060,384.

Patented Apr. 29, 1913.
2 SHEETS—SHEET 1.

Witnesses
Clifton C. Hallowell
J. O. R. Kelly

Inventor
HERBERT S. VALENTINE,
By E. A. Kelly,
Attorney

H. S. VALENTINE.
ELECTRIC BRAKE FOR HOISTS.
APPLICATION FILED JULY 31, 1912.
1,060,384.
Patented Apr. 29, 1913
2 SHEETS—SHEET 2.
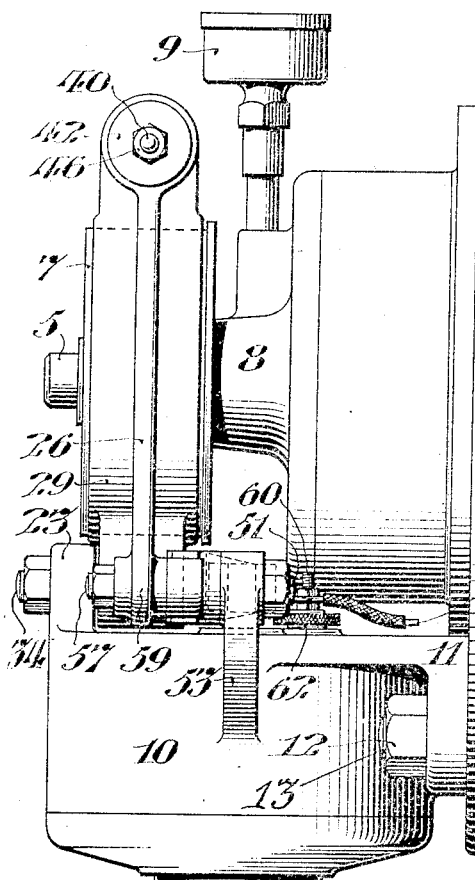
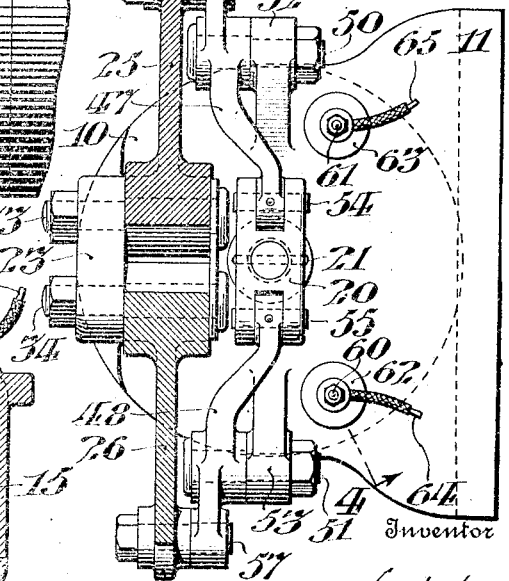
Witnesses
Clifton C. Hallowell
J. O'R. Kelly
Inventor
HERBERT S. VALENTINE,
By E. J. A. ..., Attorney

UNITED STATES PATENT OFFICE.

HERBERT S. VALENTINE, OF READING, PENNSYLVANIA, ASSIGNOR TO READING CRANE & HOIST WORKS, OF READING, PENNSYLVANIA.

ELECTRIC BRAKE FOR HOISTS.

1,060,384.  Specification of Letters Patent. Patented Apr. 29, 1913.

Application filed July 31, 1912. Serial No. 712,467.

*To all whom it may concern:*

Be it known that I, HERBERT S. VALENTINE, citizen of the United States, residing at Reading, in the county of Berks and State of Pennsylvania, have invented certain new and useful Improvements in Electric Brakes for Hoists, of which the following is a specification.

My invention particularly relates to electrically actuated brakes, and is especially applicable to automatically controlled brakes for electric hoists, wherein it is essential that the winding drum be prevented from rotation to hold the load when not actuated by the driving mechanism.

The principal objects of my invention are to provide an automatically controlled electric brake which is simple in construction and efficient in its actuation.

Other objects of my invention are to provide an electric brake arranged to be electrically connected with the circuit of the driving motor and having its parts so correlated as to readily respond to the opening and closing of the motor circuit.

Briefly stated, my invention includes pivoted levers having diametrically opposed brake shoes coöperative with the brake drum to prevent the rotation of the motor shaft, and normally actuated by spring pressure tending to engage the shoes with said drum, said shoes being released by a solenoid electrically connected to be actuated contemporaneously with the driving motor, and mechanically connected with the levers carrying the shoes, by rocking levers pivoted on stationary axes and having long and short arms upon opposite sides of their axes, the longer arms being pivotally connected with the core of said solenoid and the shorter arms being pivotally connected to said shoe carrying levers.

This invention also comprehends all of the various novel features of construction and arrangement of the parts hereinafter more definitely specified.

In the accompanying drawings, Figure 1 is a front elevational view of the brake mechanism constructed in accordance with my invention, ar  conveniently secured to the casing of the motor or other mechanism which it is arranged to control; Fig. 2 is a side elevational view of the structure shown in Fig. 1, and including a fragment of the motor casing; Fig. 3 is a sectional plan view of the brake mechanism *per se*, taken on the line 3—3 in Fig. 1, and Fig. 4 is a central vertical sectional view of the solenoid taken through one of its electrical connections on the line 4—4 in Fig. 3.

In said figures, the shaft 5 of an electric motor or other rotary mechanism which may be included in the casing 6, and which carries the brake drum 7, is conveniently journaled in the bearing 8, having the oil cup 9 carried thereon, for supplying suitable lubricant to said shaft.

The solenoid 10, which is operative to release the brake mechanism, has the bracket 11 secured by the nuts 12 on the stud bolts 13 to the end 14 of the casing 6, and comprises the coils 15 and core 16 having the plunger 17 carried thereby and providing a reduced support 18 forming a shoulder 19 as best shown in Fig. 4 for the crosshead 20, which as shown in Fig. 3 is secured thereon by the pin 21.

The casing of the solenoid 10 is provided with an upwardly extending lug 23 which pivotally supports the brake levers 25 and 26 respectively, having the diametrically opposed broadened substantially semi-cylindrical brake shoes 28 and 29 which are respectively provided with frictional facings 30 and 31 formed of leather, fiber or other material suitable to frictionally engage the cylindrical surface of the brake drum 7.

The fulcrums 33 and 34 of the brake levers 25 and 26, as best shown in Fig. 1, are relatively close and afford a quick, free separation of the frictional facing 30 from the cylindrical surface of the drum 7 when the free ends of the brake levers are relatively shifted apart.

The free ends of the brake levers 25 and 26 are respectively provided with cups or sockets 36 and 37 opening oppositely and having apertures 38 and 39, through which the spring spindle 40 extends. The spring spindle 40 carries the plates or washers 41 and 42 relatively adjustable to vary the tension of the springs 43 and 44 seated in the respective sockets 36 and 37, by the adjusting nut 45, which is arranged to be secured in adjusted position by the lock-nut 46. The springs 43 and 44 are held under sufficient compression to normally maintain the facings 30 and 31 of the shoes 28 and 29 in such frictional engagement with the brake drum 7 as to prevent its rotation until said levers 25 and 26 are shifted in opposition to the spring pressure by a novel arrangement of lever mechanism to be hereinafter described in detail.

The release of the brake drum 7 is conveniently effected by the rocking levers 47 and 48, which are preferably fulcrumed on the pivots 50 and 51 carried by the lugs 52 and 53 extending laterally from the casing of the solenoid 7. Said rocking levers 47 and 48 respectively have their long arms pivotally connected at 54 and 55 with the crosshead 20, and their short arms pivotally connected at 56 and 57 with the lateral extensions 58 and 59 of the brake levers 25 and 26 respectively and, even though said levers have common connected points and are adapted to oscillate about the stationary fulcrums at different distances from said points, the connections 56 and 57 being ordinary pivotal connections, are sufficiently loose to permit the levers to move far enough to give the brake shoes the very small movement required; thus it will be readily seen that by reason of the peculiar construction of the lever mechanism, the brake levers 25 and 26 may be rocked outwardly on their respective fulcrums 33 and 34 to overcome the tension of the springs 43 and 44, and release the brake drum 7 by comparatively little power exerted by the solenoid.

The solenoid 10 is conveniently provided with the terminals 60 and 61 which may be mounted in the insulated bushings 62 and 63 and respectively connected by the leading wires 64 and 65 with suitable controlling means, which may be effective to simultaneously control said solenoid and the motor which effects the rotation of the brake drum 7, whereby the brake may be automatically released when the motor is actuated and applied when said motor stops.

It is not desired to limit myself to the precise details of construction and arrangement of the parts as herein set forth, as various modifications may be made therein without departing from the essential features of the invention as defined in the appended claim.

Having thus described my invention, I claim:

In an electric brake, the combination of a brake drum, a motor shaft, a pair of rocking levers, a pair of pivoted brake levers having diametrically opposed brake shoes coöperative with the drum to prevent the rotation of the motor shaft, springs tending to normally press the shoes against the drum, a solenoid having an upwardly extending central lug and a vertically movable core for releasing the shoes from contact with the drum, said solenoid being electrically connected to be actuated contemporaneously with the motor shaft and mechanically connected by the rocking levers with the brake levers, said brake levers being pivotally connected to the central lug on the solenoid in close proximity to the vertical center of the solenoid, oppositely disposed lugs extending laterally from the solenoid casing, said rocking levers being pivoted to said lateral lugs and having long arms in pivotal connection with the solenoid core and short arms on the opposite sides of their pivotal connection with the lugs which short arms are pivotally connected with the brake levers, all of which pivotal points are on the same horizontal plane, whereby a very slight upward movement of the solenoid core will effect the release of the shoes from contact with the drum and compress the springs.

In testimony whereof I affix my signature in presence of two witnesses.

HERBERT S. VALENTINE.

Witnesses:
MARY E. STAUFFER,
ED. A. KELLY.